(12) United States Patent
Sun et al.

(10) Patent No.: US 11,792,137 B2
(45) Date of Patent: Oct. 17, 2023

(54) DYNAMIC NETWORK RESOURCE ALLOCATION METHOD BASED ON NETWORK SLICING

(71) Applicant: UNIVERSITY OF ELECTRONIC SCIENCE AND TECHNOLOGY OF CHINA, Chengdu (CN)

(72) Inventors: Gang Sun, Chengdu (CN); Qing Li, Chengdu (CN); Yuhui Wang, Chengdu (CN); Hongfang Yu, Chengdu (CN); Jian Sun, Chengdu (CN); Jing Ren, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 31 days.

(21) Appl. No.: 17/874,313

(22) Filed: Jul. 27, 2022

(65) Prior Publication Data
US 2023/0062221 A1 Mar. 2, 2023

(30) Foreign Application Priority Data
Aug. 30, 2021 (CN) .......................... 202111004167.1

(51) Int. Cl.
*H04L 41/147* (2022.01)
*H04L 47/83* (2022.01)

(52) U.S. Cl.
CPC ................................ *H04L 47/83* (2022.05); *H04L 41/147* (2013.01)

(58) Field of Classification Search
CPC ................................................. H04L 41/147
See application file for complete search history.

(56) References Cited

U.S. PATENT DOCUMENTS

2021/0168031 A1  6/2021  Stockert et al.

FOREIGN PATENT DOCUMENTS

| CN | 110519783 A | 11/2019 |
|---|---|---|
| CN | 110662231 A | 1/2020 |
| CN | 112492628 A | 3/2021 |
| CN | 112613230 A | 4/2021 |
| CN | 112737823 A | 4/2021 |
| CN | 112804287 A | 5/2021 |
| CN | 113259145 A | 8/2021 |

OTHER PUBLICATIONS

Ren Yuzheng, et al., Dynamic Resources Optimization for 5G Network Slicing Based on Reinforcement Learning, ZTE Technology Journal, 2018, pp.31-36, Vol.24, No.1.

*Primary Examiner* — Ryan J Jakovac
(74) *Attorney, Agent, or Firm* — Bayramoglu Law Offices LLC

(57) ABSTRACT

A dynamic network resource allocation method based on network slicing is provided. A historical resource demand dataset of an accessed network slice is inputted into a first neural network for training. Based on a trained first neural network and the historical resource demand of the accessed network slice, a resource demand prediction information corresponding to the accessed network slice in a first prediction time period is determined. Resources are pre-allocated to the accessed network slice based on the resource demand prediction information, and resources are allocated to the accessed network slice when the first prediction time period arrives. In this way, the service provider can reasonably allocate network resources for network slices without violating the SLA, thus avoiding the waste of network resources.

7 Claims, 2 Drawing Sheets

DYNAMIC NETWORK RESOURCE ALLOCATION METHOD BASED ON NETWORK SLICING

CROSS REFERENCE TO THE RELATED APPLICATIONS

This application is based upon and claims priority to Chinese Patent Application No. 202111004167.1, filed on Aug. 30, 2021, the entire contents of which are incorporated herein by reference.

TECHNICAL FIELD

The present disclosure relates to the technical field of network resource allocation and, specifically, to a dynamic network resource allocation method based on network slicing.

BACKGROUND

As one of the key technologies of 5G (5th Generation Mobile Communication Technology), network slicing can create and maintain multiple independent customized logical networks based on the shared physical network infrastructure. Dedicated network slices tailored for different types of 5G application scenarios improve heterogeneity, flexibility, scalability, and profitability of the network, as well as the security of future network services.

Network resources of network slices are dynamically changed in real-time during actual application. In the prior art, the network resources of network slices can only be allocated through static allocation due to the limitation of the Service Level Agreement (SLA). The SLA is a mutually agreed contract between the service provider and the user or between the service providers to ensure the performance and reliability of services with specified overheads. In the static resource allocation method, the network slices occupy a large amount of unnecessary network resources, which leads to the waste of network resources. In addition, because the network slices always occupy excessive network resources, network resources allocated by the system to new network slices are reduced, resulting in a small capacity of the system.

Therefore, how to help the service providers avoid waste of network resources through reasonably allocating network resources for network slices without violating the SLA is a technical problem to be resolved by those skilled in the art.

SUMMARY

The purpose of the present disclosure is to resolve the problem that the existing technology cannot reasonably allocate network resources for network slices, resulting in the waste of network resources, and proposes a dynamic network resource allocation method based on network slicing.

The present disclosure provides the following technical solutions: A dynamic network resource allocation method based on network slicing includes:

S1: inputting a historical resource demand dataset of an accessed network slice into a first neural network for training;

S2: determining, based on a trained first neural network and the historical resource demand of the accessed network slice, resource demand prediction information corresponding to the accessed network slice in a first prediction time period; and S3: pre-allocating resources to the accessed network slice based on the resource demand prediction information and allocating resources to the accessed network slice when the first prediction time period arrives.

Further, the resource demand prediction information specifically includes a predicted node resource quantity and a predicted link resource quantity.

Further, the step of pre-allocating resources to the accessed network slice in the step S3 specifically includes determining a pre-allocated node resource quantity and a pre-allocated link resource quantity of the accessed network slice in the first prediction time period according to the following formulas:

$$\acute{d}_i^{(t)} = \gamma_d \hat{d}_i^{(t)}, \acute{i}_i^{(t)} = \gamma_l \hat{l}_i^{(t)}, \forall i \in [1, n_t], \text{ where}$$

$$\gamma_d = \begin{cases} 1+\gamma_d', & \text{if } \sum_{i=1}^{n_t} \gamma_d' \hat{d}_i^{(t)} < D \\ \dfrac{D}{\sum_{i=1}^{n_t} \hat{d}_i^{(t)}}, & \text{otherwise} \end{cases}$$

and $$\gamma_l = \begin{cases} 1+\gamma_l', & \text{if } \sum_{i=1}^{n_t} \gamma_l' \hat{l}_i^{(t)} < L \\ \dfrac{L}{\sum_{i=1}^{n_t} \hat{l}_i^{(t)}}, & \text{otherwise} \end{cases}$$

$\acute{d}_i^{(t)}$ is a pre-allocated node resource quantity of an accessed network slice i in a first prediction time period t. $\acute{i}_i^{(t)}$ is a pre-allocated link resource quantity of the accessed network slice i in the first prediction time period t. $\hat{d}_i^{(t)}$ is a predicted node resource quantity of the accessed network slice i in the first prediction time period t. $\hat{l}_i^{(t)}$ is a predicted link resource quantity of the accessed network slice i in the first prediction time period t. $n_t$ is a quantity of accessed network slices in a system in the first prediction time period t. $\gamma_d \geq 1$ represents node resource redundancy. $\gamma_l \geq 1$ represents link resource redundancy. $\gamma_d' \geq 0$ and $\gamma_l' \geq 0$ are offsets of corresponding predicted values. D is a total node resource quantity of the system. L is a total link resource quantity of the system.

Further, the method further includes the following steps:

A1: receiving access requests of all to-be-accessed network slices in real-time and storing all the access requests in a request queue;

A2: determining a total node resource quantity and a total link resource quantity that are occupied by all accessed network slices in a second prediction time period; and A3: when a preset access time point arrives, sequentially deciding whether to allow the access requests in the request queue in the second prediction time period; if yes, allowing a corresponding access request when the second prediction time period arrives; and if not, continuing to decide whether to allow a next access request until all the access requests in the request queue are completely decided.

Further, the step of determining the total node resource quantity and the total link resource quantity in the step A2 is specifically performed by using the following formulas:

$$\hat{d}_{sys}^{(T)} = \sum_{i=1}^{n_T} \acute{d}_i^{(T)}, \hat{l}_{sys}^{(T)} = \sum_{i=1}^{n_T} \acute{i}_i^{(T)}, \forall T \in [T_{ac}+1, T_{ac}+T_{sys}],$$

where $\hat{d}_{sys}^{(T)}$ is the total node resource quantity, $\hat{l}_{sys}^{(T)}$ is the total link resource quantity, $T_{sys}$ is a length of a system resource demand prediction window, $\acute{d}_i^{(T)}$ and $\acute{l}_i^{(T)}$ are, respectively, a node resource quantity and a link resource quantity to be occupied by an accessed network slice i at a moment T in the second prediction time period $[T_{ac} + 1, T_{ac} + T_{sys}]$, $T_{ac}$ is the preset access time point, and $n_T$ is a quantity of accessed network slices in the system at the moment T in the second prediction time period.

Further, all the network slices are classified into high-quality network slices and low-quality network slices.

Further, the step of deciding whether to allow the access requests in the second prediction time period in the step A3 is specifically performed by using the following formulas:

$$\exists t_{start} \in [T_{ac} + 1, T_{ac} + T_{adm}], \forall T \in [t_{start}, t_{start} + T^{dur}], \hat{d}_{sys}^{(T)} + d_{max} \leq D, \hat{l}_{sys}^{(T)} + l_{max} \leq L,$$

where $t_{start}$ is an instantiation time point of a to-be-accessed network slice corresponding to the access request, $T_{ac}$ is a decision-making time point, $\hat{d}_{sys}^{(T)}$ and $\hat{l}_{sys}^{(T)}$ are, respectively, a total node resource quantity and a total link resource quantity that are occupied by all the network slices at the moment T in the second prediction time period, $T_{adm}$ is an access window dimension, $T^{dur}$ is survival duration of the to-be-accessed network slice corresponding to the access request, and $d_{max}$ and $l_{max}$ are, respectively, an upper limit of allocable node resources and an upper limit of allocable link resources; if a user requests a high-quality network slice, then $\langle d_{max}, l_{max} \rangle = \langle d_{max}^H, l_{max}^H \rangle$; if the user requests a standard quality network slice, then $\langle d_{max}, l_{max} \rangle = \langle d_{max}^S, l_{max}^S \rangle$; D is a total node resource quantity of the system, L is a total link resource quantity of the system, $d_{max}^H$ is an upper limit of node resources for the high-quality network slices, $l_{max}^H$ is an upper limit of link resources for the high-quality network slices, $d_{max}^s$ is an upper limit of noderesources for standard quality network slices, and $l_{max}^s$ is an upper limit of link resources for the standard quality network slices.

Further, in the step A3, each time an access request is decided to be allowed in the second prediction time period, the total node resource quantity and the total link resource quantity are updated instantaneously, and the next access request is decided after the total node resource quantity and the total link resource quantity are updated.

Further, the total node resource quantity and the total link resource quantity are updated by using the following formulas:

$$\hat{d}_{sys}^{(TT)} = \hat{d}_{sys}^{(T)} + d_{max}, \hat{l}_{sys}^{(TT)} = \hat{l}_{sys}^{(T)} + l_{max}, \forall T \in [t_{start}, t_{start} + T^{dur}]$$

where $\hat{d}_{sys}^{(TT)}$ is an updated total node resource quantity, $\hat{l}_{sys}^{(TT)}$ is an updated total link resource quantity, $\hat{d}_{sys}^{(T)}$ is the total node resource quantity before the update, $\hat{l}_{sys}^{(T)}$ is the total link resource quantity before the update, $d_{max}$ and $l_{max}$ are, respectively, an upper limit of allocable node resources and an upper limit of allocable link resources, $t_{start}$ is an instantiation time point of a to-be-accessed network slice corresponding to the access request, and $T^{dur}$ is survival duration of the to-be-accessed network slice corresponding to the access request.

Compared with the prior art, the present disclosure has the following beneficial effects:
(1) The present disclosure includes: inputting the historical resource demand dataset of the network slice into the preset neural network for training; determining, based on the trained first neural network and the historical resource demand of the accessed network slice, the resource demand prediction information corresponding to the accessed network slice in the first prediction time period, where the prediction time period includes multiple time points, and the resource demand prediction information includes a resource demand prediction value corresponding to each time point; and pre-allocating resources to the network slice based on the resource demand prediction information and allocating resources to the network slice when a next time point arrives. In this way, the service provider can reasonably allocate network resources for network slices without violating the SLA, thus avoiding the waste of network resources.
(2) The network resource pre-allocation algorithm proposed in the present disclosure can dynamically allocate node resources and link resources for the network slices based on the resource demand prediction information, thereby avoiding waste caused by allocating redundant resources, improving resource utilization, and reducing resource costs of the network slices.
(3) The access control algorithm proposed in the present disclosure can assist access decision-making by using the prediction information to avoid waste of system resources caused by the overly conservative access policy and reduce the waiting time of user requests.

DETAILED DESCRIPTION OF THE EMBODIMENTS

The technical solutions in the embodiments of this application are clearly and completely described below with reference to the drawings in the embodiments of this application. It will become apparent that the described embodiments are merely some, rather than all, of the embodiments of this application. All other embodiments obtained by those of ordinary skill in the art based on the embodiments of the present disclosure without creative efforts should fall within the protection scope of the present disclosure.

As described in the background art, in the existing technology, the service provider cannot efficiently allocate network resources for network slices without violating the SLA.

Figure 1:
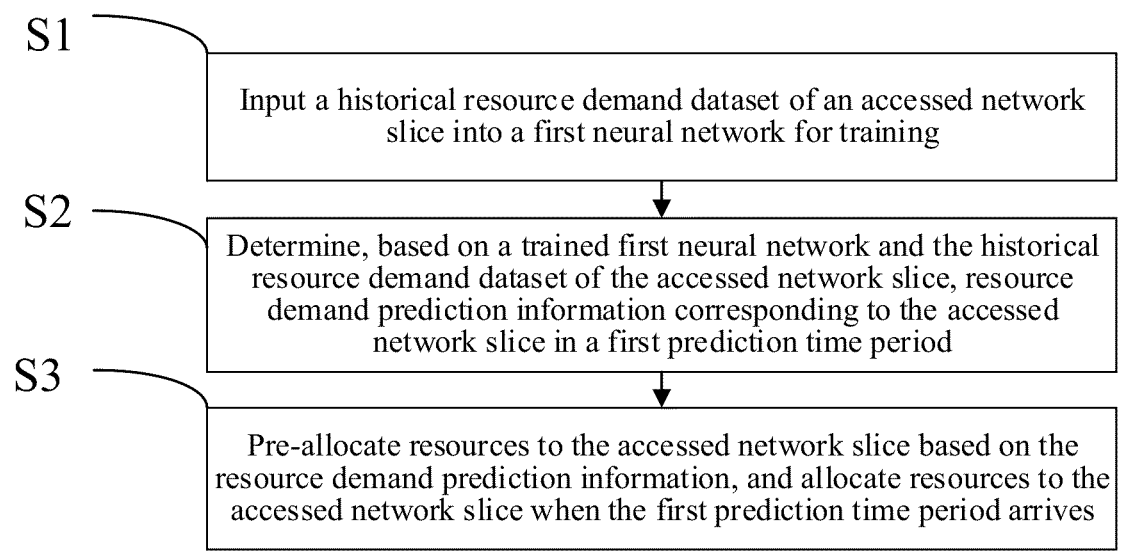
FIG. 1 is a schematic flowchart of a dynamic network resource allocation method based on network slicing according to an embodiment of the present disclosure.

Therefore, this application proposes a dynamic network resource allocation method based on network slicing. FIG. 1 is a schematic flowchart of a dynamic network resource allocation method based on network slicing according to an embodiment of this application. The method includes the following steps:

S1: Input a historical resource demand dataset of an accessed network slice into a first neural network for training.

Figure 2:
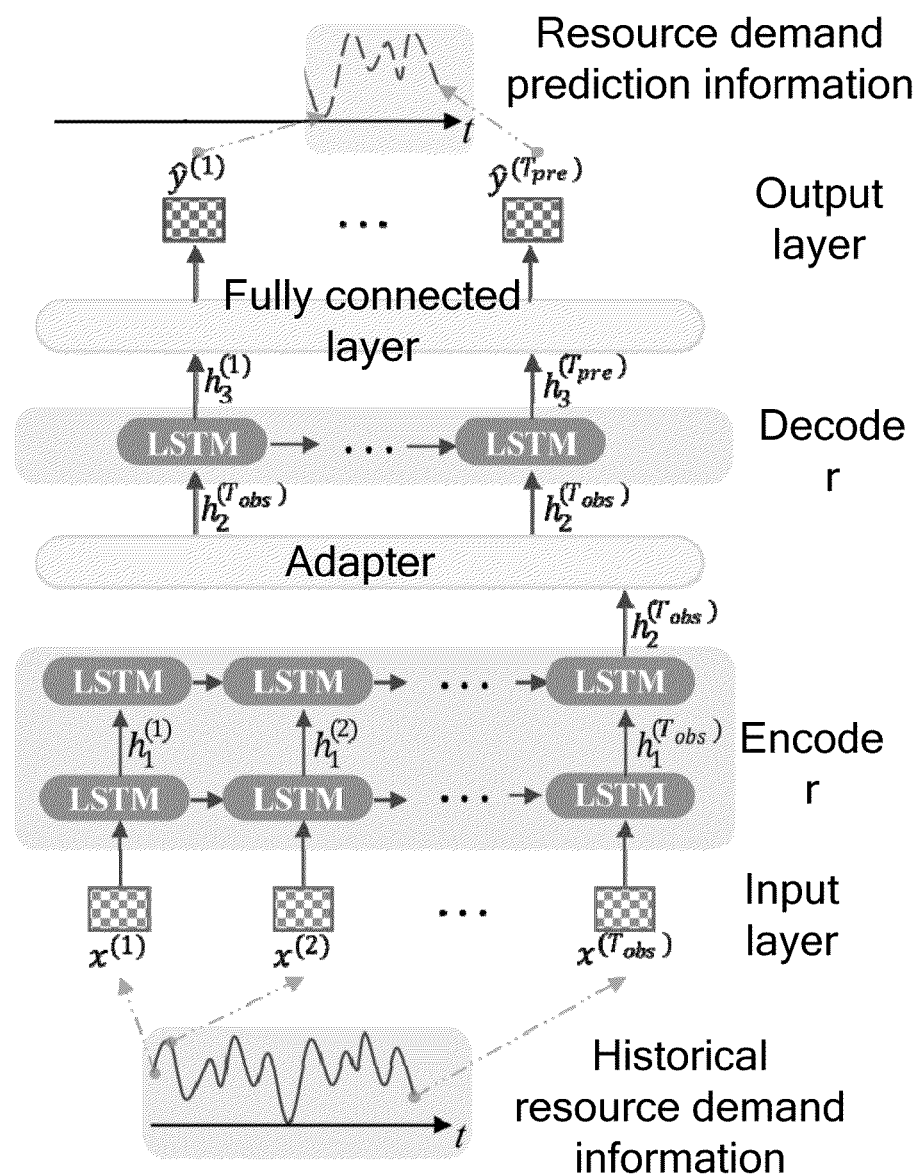
FIG. 2 is a schematic structural diagram of an encoder-decoder long short-term memory (LSTM) network according to an embodiment of the present disclosure.

In a specific application scenario, the first preset neural network is specifically an encoder-decoder LSTM network with preference (LSTM-P), and the structure is shown in FIG. 2. Each LSTM unit consists of 100 neurons, LSTM units in the same layer are the same LSTM unit at different moments, and the encoder consists of two LSTM units. The resource demand history information is input, and a hidden state of the second LSTM unit at the last moment of a history window $T_{obs}$ is output. The adapter converts the encoder output into a decoder input format. The decoder consists of a single LSTM unit, and a hidden state of the LSTM unit at each moment of a prediction window $T_{pre}$ is output. A fully connected layer consists of a single neuron encapsulated through TimeDistributed(·), which calculates resource demand prediction information based on the output data of the decoder and outputs the resource demand prediction information to the output layer.

In this embodiment of this application, a training process of the first predictive neural network, that is, the step S1, specifically includes the following sub-steps:

S11: Input the historical resource demand dataset into the encoder of the first predictive neural network to obtain encoder output data.

S12: Input the encoder output data into the decoder of the first predictive neural network to obtain decoder output data.

S13: Input the decoder output data into the fully connected layer of the first predictive neural network to obtain a prediction sequence.

S14: Determine a prediction loss between the prediction sequence and a real value based on a loss function and adjust a parameter value of the first neural network based on the prediction loss.

S15: Treat step S11 to step S14 as one iteration and stop training after reaching a preset number of iterations.

Specifically, the historical resource demand dataset $x = \{x^{(1)}, x^{(2)}, ..., x^{(t)}, ..., x^{(T_{obs})}\}$ of the accessed network slice is input into the encoder of the LSTM-P, and $h_1^{(t)} \leftarrow LSTM(x^{(t)}, h_1^{(t-1)}, c_1^{(t-1)})$ and $h_2^{(t)} = LSTM(h_1^{(t)}, h_2^{(t-2)}, c_2^{(t-1)})$ are calculated at each moment t by using the following formulas: The final hidden state $h_2^{(T_{obs})}$ of the second LSTM unit, that is, the encoder output data, is output. The specific formula is:

$$LSTM(x^{(t)}, h^{(t-1)}, c^{(t-1)}) = \begin{cases} f^{(t)} = \sigma(W_f \cdot [h^{(t-1)}, x^{(t)}] + b_f), \\ i^{(t)} = \sigma(W_i \cdot [h^{(t-1)}, x^{(t)}] + b_i), \\ \tilde{c}^{(t)} = \tanh(W_c \cdot [h^{(t-1)}, x^{(t)}] + b_c), \\ c^{(t)} = f^{(t)} \times c^{(t-1)} + i^{(t)} \times \tilde{c}^{(t)}, \\ o^{(t)} = \sigma(W_o \cdot [h^{(t-1)}, x^{(t)}] + b_o), \\ h^{(t)} = o^{(t)} \times \tanh(c^{(t)}). \end{cases}$$

The adapter converts the encoder output $h_2^{(T_{obs})}$ into the decoder input format and then inputs it into the decoder. Assuming that $t = 1, ..., T_{pre}$, $h_3^{(t)} \leftarrow LSTM(h_2^{(T_{obs})}, h_3^{(t-1)}, c_3^{(t-1)})$ is calculated by using an objective function. The hidden state of the LSTM unit, that is, the decoder output data, at each moment of 1 to $T_{pre}$ is output, that is, $h_3 = (h_3^{(1)}, h_3^{(2)}, ..., h_3^{(T_{pre})})$.

The decoder output $h_3$ is used as the input of the fully connected layer, and $\hat{y} \leftarrow W_F \cdot h_3 + b_F$ is calculated. $W_F$ and $b_F$ are neural network parameters of the fully connected layer, and specific values are obtained from the training process. The prediction sequence $\hat{y} = \{\hat{y}^{(1)}, \hat{y}^{(2)}, ..., \hat{y}^{(T_{pre})}\}$ is output.

At the moment $t_p$, when the LSTM-P is used to predict node resource demand of an accessed network slice i, the sequence $x = d_i^Q = \{d_i^{Q(t_p - T_{obs} + 1)}, d_i^{Q(t_p - T_{obs} + 2)}, ..., d_i^{Q(t_p)}\}$ is input and the sequence $\hat{y} = \hat{d}_i = \{\hat{d}_i^{(t_p+1)}, \hat{d}_i^{(t_p+2)}, ..., \hat{d}_i^{(t_p+T_{pre})}\}$ is output. When the LSTM-P is used to predict link resource demand of the accessed network slice i, the sequence $x = l_i^Q = \{l_i^{Q(t_p - T_{obs} + 1)}, l_i^{Q(t_p - T_{obs} + 2)}, ..., l_i^{Q(t_p)}\}$ is input, and the sequence $\hat{y} = \hat{l}_i = \{\hat{l}_i^{(t_p+1)}, \hat{l}_i^{(t_p+2)}, ..., \hat{l}_i^{(t_p+T_{pre})}\}$ is output.

When a resource demand prediction value $\hat{y}^{(t)}$ is higher than the real value $y^{(t)}$, the service provider allocates excessive resources to the network slice based on the prediction information, resulting in additional resource overheads. When the resource demand prediction value is lower than the real value, the service provider allocates fewer resources to the network slice than the real demand based on the prediction information, violating the SLA and resulting in high default payment. The following loss function is designed based on the characteristics of network slicing services to reflect the economic loss to the service provider from resource over-allocation and SLA violation.

$$L(y, \hat{y}) = \frac{1}{T_{pre}} \sum_{t=1}^{T_{pre}} \ell(y^{(t)}, \hat{y}^{(t)})$$

and $$\ell(y^{(t)}, \hat{y}^{(t)}) = \begin{cases} \hat{y}^{(t)} - y^{(t)}, & \text{if } \hat{y}^{(t)} > y^{(t)} \\ \beta(y^{(t)} - \hat{y}^{(t)}), & \text{if } \hat{y}^{(t)} \leq y^{(t)} \end{cases}$$

$\beta > 1$ indicates the penalty strength of SLA violation for the service provider, y is the real value, and $\hat{y}$ is the predicted value.

The service provider uses the historical resource usage data of the network slice as the training set, and $\mathcal{L}(y, \hat{y})$ as the loss function for the training process. The predictor LSTM-P is trained by using the gradient descent method or its variants. The neural network parameter is adjusted and the loss function value is reduced during the iterative training process to ensure the high accuracy of the predictor and low SLA violation rate.

The constructed LSTM-P predictor is used to implement resource pre-allocation for active slices in the network slicing system and to perform access control for pending slice requests in the waiting queue to optimize resource utilization.

It should be noted that the above neural network is only a specific implementation in this application, and those skilled in the art can flexibly choose a neural network with different configurations according to the actual situation. This does not affect the protection scope of this application.

S2: Determine, based on a trained first neural network and the historical resource demand of the accessed network slice, resource demand prediction information corresponding to the accessed network slice in a first prediction time period.

In this embodiment of this application, the resource demand prediction information specifically includes a predicted node resource quantity and a predicted link resource quantity.

S3: Pre-allocate resources to the accessed network slice based on the resource demand prediction information and allocate resources to the accessed network slice when the first prediction time period arrives.

In this embodiment of this application, the step of pre-allocating resources to the accessed network slice specifically includes determining a pre-allocated node resource quantity and a pre-allocated link resource quantity of the accessed network slice in the first prediction time period according to the following formulas:

$$\dot{d}_i^{(t)} = \gamma_d \hat{d}_i^{(t)}, \dot{i}_i^{(t)} = \gamma_l \hat{i}_i^{(t)}, \forall i \in [1, n_t], \text{where}$$

$$\gamma_d = \begin{cases} 1 + \gamma_d', & \text{if } \sum_{i=1}^{n_t} \gamma_d' \hat{d}_i^{(t)} < D \\ \dfrac{D}{\sum_{i=1}^{n_t} \hat{d}_i^{(t)}}, & \text{otherwise} \end{cases}$$

$$\gamma_l = \begin{cases} 1 + \gamma_l', & \text{if } \sum_{i=1}^{n_t} \gamma_l' \hat{i}_i^{(t)} < L \\ \dfrac{L}{\sum_{i=1}^{n_t} \hat{i}_i^{(t)}}, & \text{otherwise} \end{cases}$$

where $\dot{d}_i^{(t)}$ is a pre-allocated node resource quantity of an accessed network slice i in a first prediction time period t, $\dot{i}_i^{(t)}$ is a pre-allocated link resource quantity of the accessed network slice i in the first prediction time period t, $\hat{d}_i^{(t)}$ is a predicted node resource quantity of the accessed network slice i in the first prediction time period t, $\hat{i}_i^{(t)}$ is a predicted link resource quantity of the accessed network slice i in the first prediction time period t, $n_t$ is a quantity of accessed network slices in a system in the first prediction time period t, $\gamma_d \geq 1$ represents node resource redundancy, $\gamma_l \geq 1$ represents link resource redundancy, $\gamma_d' \geq 0$ and $\gamma_l' \geq 0$ are offsets of corresponding predicted values, D is a total node resource quantity of the system, and L is a total link resource quantity of the system.

In this embodiment of this application, the method further includes the following steps:

A1: Receive access requests of all to-be-accessed network slices in real-time and store all the access requests in a request queue.

A2: Determine a total node resource quantity and a total link resource quantity that are occupied by all accessed network slices in a second prediction time period.

A3: When a preset access time point arrives, sequentially decide whether to allow the access requests in the request queue in the second prediction time period; if yes, allow a corresponding access request when the second prediction time period arrives; and if not, continue to decide whether to allow a next access request until all the access requests in the request queue are completely decided.

In a specific application scenario, the access requests of the to-be-accessed network slices, that is, network slice requests from users, are received in real-time and stored in the request queue. In addition, the access time point is preset in this application, and then the total node resource quantity and the total link resource quantity that are occupied by all the accessed network slices in the second prediction time period are determined first to decide whether to allow the access requests.

In this embodiment of this application, the step of determining the total node resource quantity and the total link resource quantity in the step A2 is specifically performed by using the following formulas:

$$\hat{d}_{sys}^{(T)} = \sum_{i=1}^{n_T} \dot{d}_i^{(T)}, \hat{i}_{sys}^{(T)} = \sum_{i=1}^{n_T} \dot{i}_i^{(T)}, \forall T \in [T_{ac}+1, T_{ac}+T_{sys}]$$

where $\hat{d}_{sys}^{(T)}$ is the total node resource quantity, $\hat{i}_{sys}^{(T)}$ is the total link resource quantity, $T_{sys}$ is a length of a system resource demand prediction window, $\dot{d}_i^{(T)}$ and $\dot{i}_i^{(T)}$ are, respectively, a node resource quantity and a link resource quantity to be occupied by an accessed network slice i at a moment T in the second prediction time period $[T_{ac}+1, T_{ac}+T_{sys}]$, $T_{ac}$ is the preset access time point, and $n_T$ is a quantity of accessed network slices in the system at the moment T in the second prediction time period.

Specifically, when the total node resource quantity and the total link resource quantity are determined, first, a node resource quantity and a link resource quantity that are occupied by each accessed network slice in the second prediction time period are determined, and then the node resource quantities and the link resource quantities occupied by all the accessed network slices in the second prediction time period are summed, respectively.

It should be noted that the node resource quantity and the link resource quantity that are occupied by the accessed network slice in the second prediction time period are specifically determined by using a second neural network, which is the same as the first neural network, that is, the LSTM. The prediction formula is also the same as the first neural network.

In this embodiment of this application, all the network slices are classified into high-quality network slices and low-quality network slices.

In this embodiment of this application, the step of deciding whether to allow the access requests in the second prediction time period in the step A3 is specifically performed by using the following formulas:

$$\exists t_{start} \in [T_{ac}+1, T_{ac}+T_{adm}], \forall T \in [t_{start}, t_{start}+T^{dur}],$$

$$\hat{d}_{sys}^{(T)} + d_{max} \leq D, \hat{i}_{sys}^{(T)} + l_{max} \leq L,$$

where $t_{start}$ is an instantiation time point of a to-be-accessed network slice corresponding to the access request, $T_{ac}$ is a decision-making time point, $\hat{d}_{sys}^{(T)}$ and $\hat{i}_{sys}^{(T)}$ are, respectively, a total node resource quantity and a total link resource quantity that are occupied by all the network slices at the moment T in the second prediction time period, $T_{adm}$ is an access window dimension, $T^{dur}$ is survival duration of the to-be-accessed network slice corresponding to the access request, $d_{max}$ and $l_{max}$ are, respectively, an upper limit of allocable node resources and an upper limit of allocable link resources; if a user requests a high-quality network slice, then $\langle d_{max}, l_{max} \rangle = \langle d_{max}^H, l_{max}^H \rangle$; if the user requests a standard quality network slice, then $\langle d_{max}, l_{max} \rangle = \langle d_{max}^S, l_{max}^S \rangle$; D is a total node resource quantity of the system, L is a total link resource quantity of the system, $d_{max}^H$ is an upper limit of node resources for the high-quality network slices, $l_{max}^H$ is an upper limit of link resources for the high-quality network slices, $d_{max}^S$ is an upper limit of node resources for standard quality network slices, and $l_{max}^S$ is an upper limit of link resources for the standard quality network slices.

Specifically, the upper limit is a maximum resource quantity artificially set for each slice, and the resources occupied by each slice are limited in a specific range to avoid a slice from occupying most of the system resources.

The total node resource quantity D of the system is specifically a total node resource quantity available to the service provider, that is, the total node resource quantity in the system that can be allocated to the network slices. The total link resource quantity L of the system is specifically a total link resource quantity available to the service provider, that is, the total link resource quantity in the system that can be allocated to the network slices.

In this embodiment of this application, in the step A3, each time an access request is decided to be allowed in the second prediction time period, the total node resource quantity and the total link resource quantity are updated instantaneously, and the next access request is decided after the total node resource quantity and the total link resource quantity are updated.

In this embodiment of this application, the total node resource quantity and the total link resource quantity are updated by using the following formulas:

$$\hat{d}_{sys}^{(TT)} = \hat{d}_{sys}^{(T)} + d_{max}, \hat{l}_{sys}^{(TT)} = \hat{l}_{sys}^{(T)} + l_{max}, \forall T \in \left[ t_{start}, t_{start} + T^{dur} \right]$$

where $\hat{d}_{sys}^{(TT)}$ is an updated total node resource quantity, $\hat{l}_{sys}^{(TT)}$ is an updated total link resource quantity, $\hat{d}_{sys}^{(T)}$ is the total node resource quantity before the update, $\hat{l}_{sys}^{(T)}$ is the total link resource quantity before the update, $d_{max}$ and $l_{max}$ are, respectively, an upper limit of allocable node resources and an upper limit of allocable link resources, $t_{start}$ is an instantiation time point of a to-be-accessed network slice corresponding to the access request, and $T^{dur}$ is survival duration of the to-be-accessed network slice corresponding to the access request.

Specifically, when the next access request is decided, indicators of the updated total node resource quantity and the updated total link resource quantity are changed to the indicators of the total node resource quantity and the total link resource quantity before the update.

Those of ordinary skill in the art will understand that the embodiments described herein are intended to help readers understand the principles of the present disclosure, and it should be understood that the protection scope of the present disclosure is not limited to the specific statements and embodiments of the present disclosure. Those of ordinary skill in the art may make other various specific modifications and combinations according to the technical teachings disclosed in the present disclosure without departing from the essence of the present disclosure, and such modifications and combinations still fall within the protection scope of the present disclosure.

What is claimed is:

1. A dynamic network resource allocation method based on network slicing, comprising:
    S1: inputting a historical resource demand dataset of an accessed network slice into a first neural network for training;
    S2: determining, based on a trained first neural network and the historical resource demand of the accessed network slice, resource demand prediction information corresponding to the accessed network slice in a first prediction time period; and
    S3: pre-allocating resources to the accessed network slice based on the resource demand prediction information, and allocating resources to the accessed network slice when the first prediction time period arrives;
    wherein the resource demand prediction information comprises a predicted node resource quantity and a predicted link resource quantity;
    wherein the step of pre-allocating resources to the accessed network slice in the step S3 comprises determining a pre-allocated node resource quantity and a pre-allocated link resource quantity of the accessed network slice in the first prediction time period according to the following formulas:

$$\dot{d}_i^{(t)} = \gamma_d \hat{d}_i^{(t)}, \dot{l}_i^{(t)} = \gamma_l \hat{l}_i^{(t)}, \forall i \in [1, n_t],$$

wherein if $$\sum_{i=1}^{n_t} \gamma_d' \hat{d}_i^{(t)} < D, \text{then } \gamma_d = 1 + \gamma_d', \text{otherwise, } \gamma_d = \frac{D}{\sum_{i=1}^{n_t} \hat{d}_i^{(t)}}; \text{and}$$

$$\text{if } \sum_{i=1}^{n_t} \gamma_l' \hat{l}_i^{(t)} < L, \text{then } \gamma_l = 1 + \gamma_l', \text{otherwise, } \gamma_l = \frac{L}{\sum_{i=1}^{n_t} \hat{l}_i^{(t)}};$$

wherein $\dot{d}_i^{(t)}$ is a pre-allocated node resource quantity of an accessed network slice i in a first prediction time period t, $\dot{l}_i^{(t)}$ is a pre-allocated link resource quantity of the accessed network slice i in the first prediction time period t, $\hat{d}_i^{(t)}$ is a predicted node resource quantity of the accessed network slice i in the first prediction time period t, $\hat{l}_i^{(t)}$ is a predicted link resource quantity of the accessed network slice i in the first prediction time period t, $n_t$ is a quantity of accessed network slices in a system in the first prediction time period t, $\gamma_d \geq 1$ represents node resource redundancy, $\gamma_l \geq 1$ represents link resource redundancy, $\gamma_d' \geq 0$ and $\gamma_l' \geq 0$ are offsets of corresponding predicted values, D is a total node resource quantity of the system, and L is a total link resource quantity of the system.

2. The dynamic network resource allocation method based on network slicing according to claim 1, further comprising:
    A1: receiving access requests of all to-be-accessed network slices in real-time and storing all the access requests in a request queue;
    A2: determining a total node resource quantity and a total link resource quantity that are occupied by all accessed network slices in a second prediction time period; and
    A3: when a preset access time point arrives, sequentially deciding whether to allow the access requests in the request queue in the second prediction time period; if yes, allowing a corresponding access request when the second prediction time period arrives; and if not, continuing to decide whether to allow a next access request until all the access requests in the request queue are completely decided.

3. The dynamic network resource allocation method based on network slicing according to claim 2, wherein the step of determining the total node resource quantity and the total link resource quantity in the step A2 is performed by using the following formulas:

$$\hat{d}_{sys}^{(T)} = \sum_{i=1}^{n_T} \dot{d}_i^{(T)}, \hat{l}_{sys}^{(T)} = \sum_{i=1}^{n_T} \dot{l}_i^{(T)}, \forall T \in \left[ T_{ac} + 1, T_{ac} + T_{sys} \right],$$

wherein $\hat{d}_{sys}^{(T)}$ is the total node resource quantity, $\hat{l}_{sys}^{(T)}$ is the total link resource quantity, $T_{sys}$ is a length of a system resource demand prediction window, $\dot{d}_i^{(T)}$ and $\dot{l}_i^{(T)}$ are, respectively, a node resource quantity and a link resource quantity to be occupied by an accessed network slice i at a moment T in the second prediction time period $$\left[ T_{ac} + 1, T_{ac} + T_{sys} \right], T_{ac}$$

is the preset access time point, and $n_T$ is a quantity of accessed network slices in the system at the moment T in the second prediction time period.

4. The dynamic network resource allocation method based on network slicing according to claim 2, wherein all the network slices are classified into high-quality network slices and low-quality network slices.

5. The dynamic network resource allocation method based on network slicing according to claim 4, wherein the step of deciding whether to allow the access requests in the second prediction time period in the step A3 is performed by using the following formulas:

$$\exists t_{start} \in [T_{ac}+1, T_{ac}+T_{adm}], \forall T \in [t_{start}, t_{start}+T^{dur}],$$
$$\hat{d}_{sys}^{(T)} + d_{max} \leq D, \hat{l}_{sys}^{(T)} + l_{max} \leq L,$$

wherein $t_{start}$ is an instantiation time point of a to-be-accessed network slice corresponding to the access request, $T_{ac}$ is a decision-making time point, $\hat{d}_{sys}^{(T)}$ and $\hat{l}_{sys}^{(T)}$ are, respectively, a total node resource quantity and a total link resource quantity that are occupied by all the network slices at the moment T in the second prediction time period, $T_{adm}$ is an access window dimension, $T^{dur}$ is survival duration of the to-be-accessed network slice corresponding to the access request, $d_{max}$ and $l_{max}$ are, respectively, an upper limit of allocable node resources and an upper limit of allocable link resources; if a user requests a high-quality network slice, then $\langle d_{max}, l_{max} \rangle = \langle d_{max}^H, l_{max}^H \rangle$; if the user requests a standard quality network slice, then $\langle d_{max}, l_{max} \rangle = \langle d_{max}^S, l_{max}^S \rangle$; D is a total node resource quantity of the system, L is a total link resource quantity of the system, $d_{max}^H$ is an upper limit of node resources for the high-quality network slices, $l_{max}^H$ is an upper limit of link resources for the high-quality network slices, $d_{max}^S$ is an upper limit of node resources for standard quality network slices, and $l_{max}^S$ is an upper limit of link resources for the standard quality network slices.

6. The dynamic network resource allocation method based on network slicing according to claim 3, wherein in the step A3, each time an access request is decided to be allowed in the second prediction time period, the total node resource quantity and the total link resource quantity are updated instantaneously, and a next access request is decided after the total node resource quantity and the total link resource quantity are updated.

7. The dynamic network resource allocation method based on network slicing according to claim 6, wherein the total node resource quantity and the total link resource quantity are updated by using the following formulas:

$$\hat{d}_{sys}^{(TT)} = \hat{d}_{sys}^{(T)} + d_{max}, \hat{l}_{sys}^{(TT)} = \hat{l}_{sys}^{(T)} + l_{max}, \forall T \in [t_{start}, t_{start}+T^{dur}],$$

wherein $\hat{d}_{sys}^{(TT)}$ is an updated total node resource quantity, $\hat{l}_{sys}^{(TT)}$ is an updated total link resource quantity, $\hat{d}_{sys}^{(T)}$ is the total node resource quantity before update, $\hat{l}_{sys}^{(T)}$ is the total link resource quantity before update, $d_{max}$ and $l_{max}$ are, respectively, an upper limit of allocable node resources and an upper limit of allocable link resources, $t_{start}$ is an instantiation time point of a to-be-accessed network slice corresponding to the access request, and $T^{dur}$ is survival duration of the to-be-accessed network slice corresponding to the access request.

* * * * *